United States Patent
Van Stiphout et al.

(10) Patent No.: US 11,628,770 B2
(45) Date of Patent: Apr. 18, 2023

(54) DRIVE FOR AN ADJUSTING INSTRUMENT, IN PARTICULAR FOR ADJUSTING AN EXTERIOR VISION UNIT OF A MOTOR VEHICLE

(71) Applicant: MCi (Mirror Controls International) Netherlands B.V., Woerden (NL)

(72) Inventors: Paulus Gerardus Maria Van Stiphout, Woerden (NL); Bastiaan Bartjan Maat, Groot-Ammers (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 68 days.

(21) Appl. No.: 16/982,184

(22) PCT Filed: Mar. 21, 2019

(86) PCT No.: PCT/NL2019/050171
§ 371 (c)(1),
(2) Date: Sep. 18, 2020

(87) PCT Pub. No.: WO2019/182442
PCT Pub. Date: Sep. 26, 2019

(65) Prior Publication Data
US 2021/0024001 A1    Jan. 28, 2021

(30) Foreign Application Priority Data

Mar. 21, 2018   (NL) ...................... 2020641

(51) Int. Cl.
*B60R 1/072* (2006.01)
*B60R 1/074* (2006.01)
(Continued)

(52) U.S. Cl.
CPC .............. *B60R 1/072* (2013.01); *B60R 1/074* (2013.01); *B60R 1/066* (2013.01); *B60R 2001/1253* (2013.01)

(58) Field of Classification Search
CPC ........... B60R 1/07; B60R 1/072; B60R 1/074; B06R 1/066
(Continued)

(56) References Cited

U.S. PATENT DOCUMENTS 3,609,014 A * 9/1971 Kurz, Jr. ................. B60R 1/072
74/89.41
4,056,253 A * 11/1977 Repay ..................... B60R 1/072
248/650

(Continued)

FOREIGN PATENT DOCUMENTS

DE    28 1 0 888 A1    9/1979
GB    2 032 367 A    5/1980
(Continued)

*Primary Examiner* — Ricky D Shafer
(74) *Attorney, Agent, or Firm* — Volpe Koenig

(57) ABSTRACT

Drive for an adjusting instrument, comprising a single motor, in particular an electric motor, and a driving shaft coupled therewith. The driving shaft cooperates via a transmission selectively with a first and a second driving path respectively. The drive comprises furthermore an operating mechanism with which the transmission is switchable between the first and the second driving path. The operating mechanism is energized by the motor via the driving shaft and is configured, upon successive energization of the motor from rest of the drive, to select alternately the first and the second driving path as initial driving path.

31 Claims, 7 Drawing Sheets

(51) Int. Cl.
 *B60R 1/066* (2006.01)
 *B60R 1/12* (2006.01)
(58) Field of Classification Search
 USPC .................................................. 359/874, 877
 See application file for complete search history.

(56) References Cited

U.S. PATENT DOCUMENTS

| | | | | | |
|---|---|---|---|---|---|
| 4,153,342 | A | * | 5/1979 | Mittelhauser | ........... B60R 1/072 |
| | | | | | 359/877 |
| 4,171,873 | A | * | 10/1979 | Repay | ..................... B60R 1/072 |
| | | | | | 248/479 |
| 4,202,603 | A | * | 5/1980 | Miyauchi | ................ B60R 1/072 |
| | | | | | 359/873 |
| 4,245,893 | A | * | 1/1981 | Lafont | ...................... B60R 1/07 |
| | | | | | 359/876 |
| 4,273,417 | A | * | 6/1981 | Mittelhauser | ........... B60R 1/062 |
| | | | | | 359/873 |
| 4,324,454 | A | * | 4/1982 | Kumai | ..................... B60R 1/072 |
| | | | | | 359/873 |
| 4,474,428 | A | * | 10/1984 | Wunsch | ................ F16D 41/206 |
| | | | | | 74/502.1 |
| 5,494,242 | A | * | 2/1996 | Ludwick | ................... B61L 5/02 |
| | | | | | 246/406 |
| 5,582,370 | A | * | 12/1996 | Myers | ...................... B61L 5/06 |
| | | | | | 74/577 M |
| 6,042,060 | A | * | 3/2000 | Sargis | ....................... B61L 5/06 |
| | | | | | 246/406 |
| 6,296,208 | B1 | * | 10/2001 | Franke | .................... B61L 5/107 |
| | | | | | 246/220 |
| 6,612,707 | B2 | * | 9/2003 | Kaspar | .................... B60R 1/072 |
| | | | | | 359/873 |
| 7,004,594 | B2 | * | 2/2006 | Shimizu | ................. B60R 1/072 |
| | | | | | 359/876 |
| 7,464,620 | B2 | * | 12/2008 | Li | .......................... F16H 37/06 |
| | | | | | 74/424.7 |

FOREIGN PATENT DOCUMENTS

| | | | |
|---|---|---|---|
| JP | 63-254254 | * | 10/1988 |
| JP | 63254254 A | | 10/1988 |
| JP | 2007303278 A | | 11/2007 |

* cited by examiner

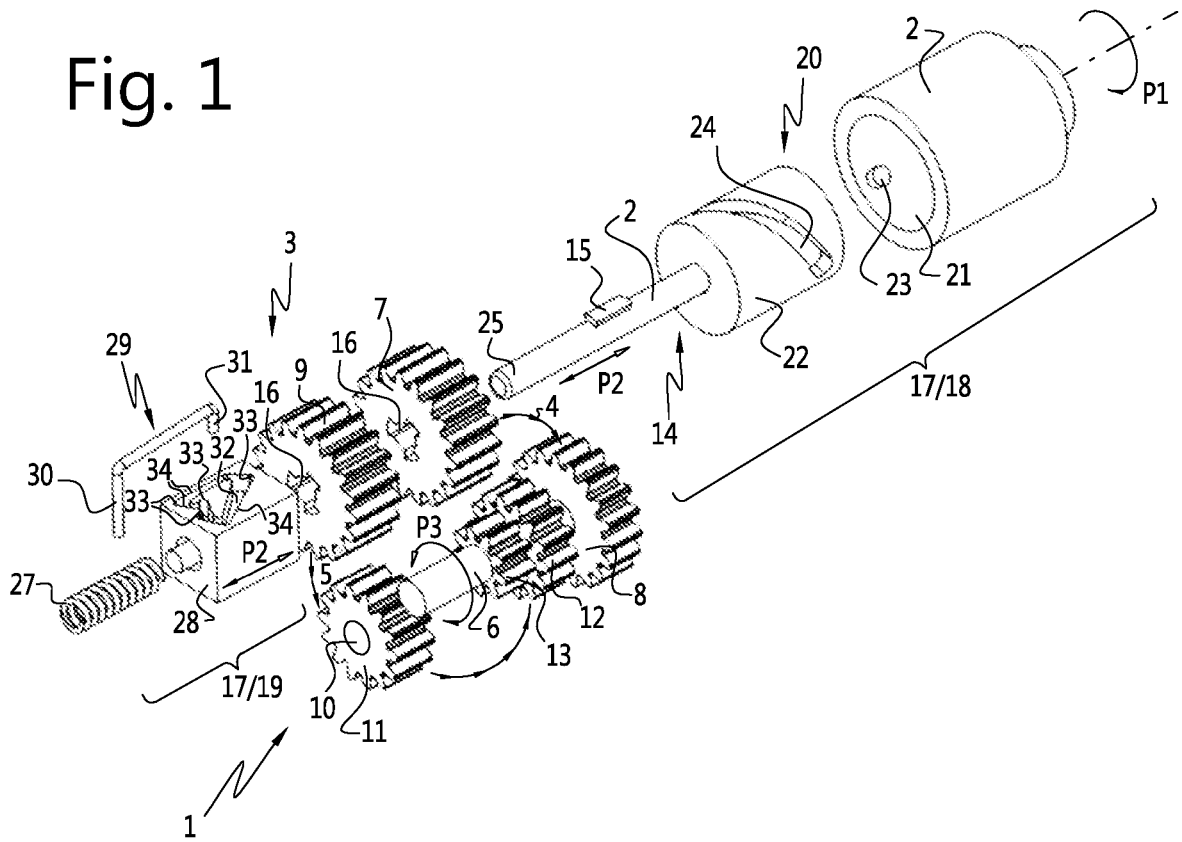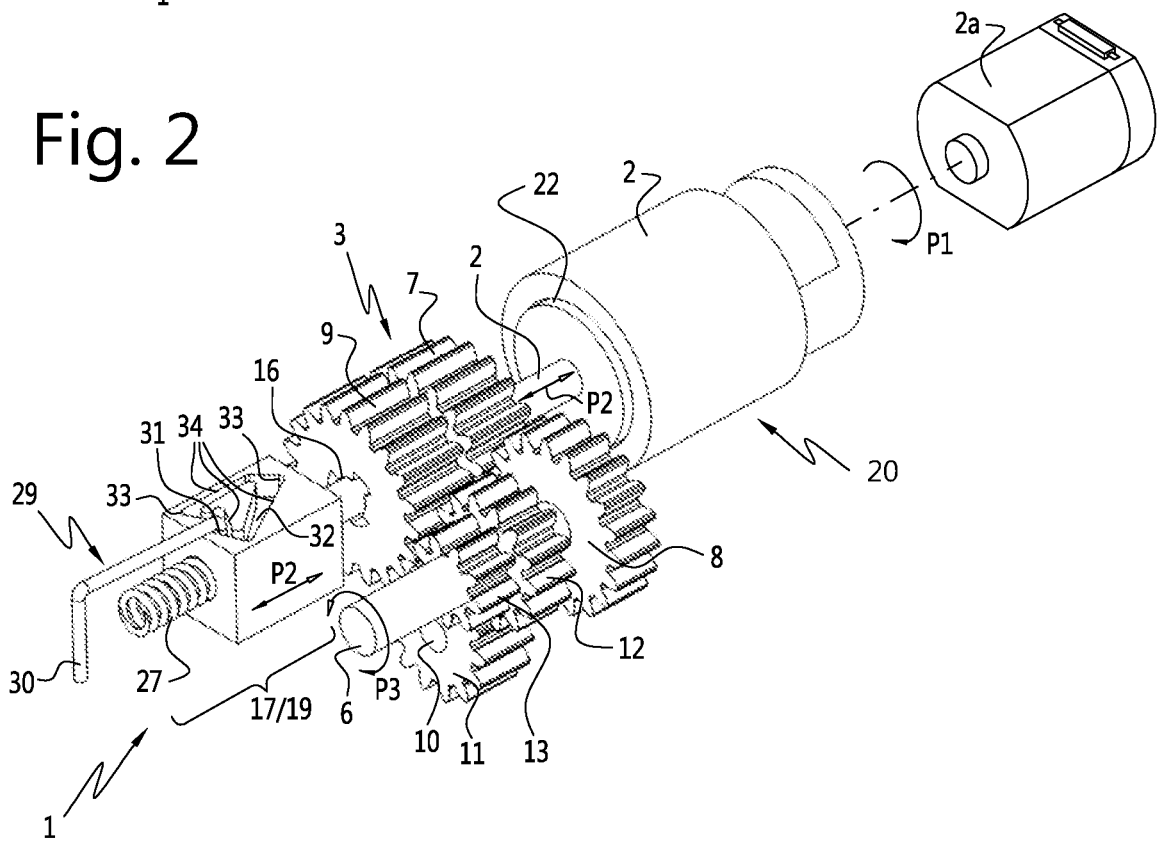

Fig. 10A
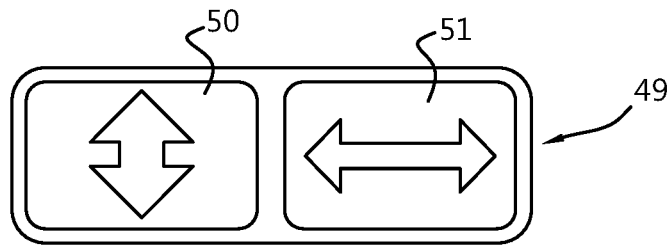
Fig. 10B
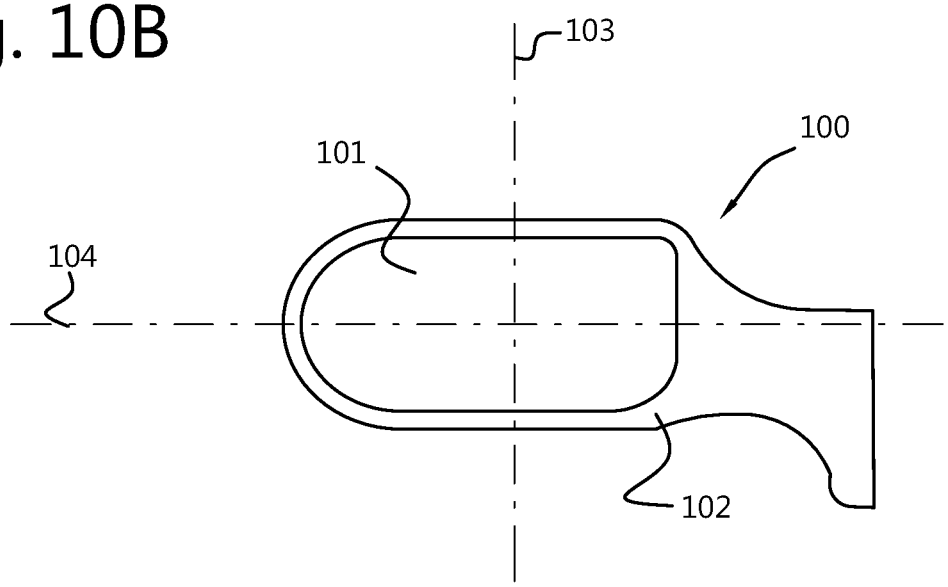
Fig. 10C
| Push Button Status | Current | Output | Current2 | Output2 |
|---|---|---|---|---|
| DeActivated | 0 | no movement | 0 | no movement |
| Activated | +/- | Top - Down | -/+ | Left - Right |
| DeActivated | 0 | no movement | 0 | no movement |
| Activated | +/- | Down - Top | -/+ | Right - Left |
| DeActivated | 0 | no movement | 0 | no movement |

DRIVE FOR AN ADJUSTING INSTRUMENT, IN PARTICULAR FOR ADJUSTING AN EXTERIOR VISION UNIT OF A MOTOR VEHICLE

CROSS REFERENCE TO RELATED APPLICATIONS

This application is a 35 USC § 371 National Stage application of International Patent Application No. PCT/NL2019/050171, which was filed Mar. 21, 2019, entitled "DRIVE FOR AN ADJUSTING INSTRUMENT, IN PARTICULAR FOR ADJUSTING AN EXTERIOR VISION UNIT OF A MOTOR VEHICLE," which claims priority to Netherlands Patent Application No. 2020641, filed Mar. 21, 2018 and is incorporated herein by reference as if fully set forth.

The invention relates to a drive for an adjusting instrument, in particular for adjusting an exterior vision unit of a motor vehicle.

An adjusting instrument for an exterior vision element of a motor vehicle usually comprises a carrier which carries an exterior vision unit, such as an exterior mirror, camera, LIDAR and/or display. The carrier can be part of the housing of the exterior vision unit, or form a separate component thereof. The carrier is usually adjustable via a drive, in particular an electrical drive, with respect to an adjusting instrument base to be mounted on the motor vehicle, and possibly with respect to the housing of the exterior vision unit.

The adjusting instrument is often intended to adjust the vision unit about multiple adjustment axes, in particular both about an axis of standing orientation with respect to the fixed world and about an axis of lying orientation with respect to the fixed world. For example, when the exterior vision unit is in a drive position, the angle at which a driver can view via the exterior vision element can be set. Adjustment about the standing axis can usually be done in two directions, i.e., both from left to right and from right to left. Adjustment about the lying axis can usually be done likewise in two directions, i.e., both from bottom to top and from top to bottom. In practice, often the term mirror glass actuator is used. The adjusting instrument then usually comprises two plastic housing parts which are pivotably connected with each other, namely a fixation part for coupling with a carrying frame, and an adjusting part for coupling with the exterior vision unit. Typically, an output part is connected with the fixation part via two separate drives each with its own electric motor, so that the adjusting movement of the output part carrying the exterior vision unit can be carried out in a driven manner per adjustment axis.

Also, the adjusting instrument may be intended to adjust the vision unit between a park position, in which the carrier extends substantially along the vehicle, and a folded-out drive position, in which the carrier extends substantially transversely to the vehicle. Such an actuator is usually referred to by the term power fold actuator. The base of the adjusting instrument then often comprises a foot for mounting on an outer part of the body of the motor vehicle, and a base shaft extending from the foot along an axis of standing orientation with respect to the fixed world, for receiving the carrier, in particular a carrying frame for a mirror glass actuator, in a manner pivotable about the base shaft. Typically, the carrier is connected to the base via a separate drive with its own electric motor, so that the pivoting movement by which the carrier folds in and folds out can be carried out in a driven manner.

In a number of instances, the adjusting instrument may be provided with one actuator having two drives each provided with its own electric motor, with which not only the pivoting movement by which the carrier is folded in and out is carried out, but also the adjusting movement by which the carrier is adjusted about the standing and/or lying axis is carried out. The exterior vision unit can then be regarded as a two-axis power fold actuator, or as a mirror glass actuator with power fold function. In such an adjusting instrument with single actuator, the pivoting axis can then coincide with the standing adjustment axis. Such an adjusting instrument is described in EP 3218226.

In practice, adjusting instruments often comprise for each axis to be adjusted an electric motor and a driving shaft coupled thereto, which driving shaft cooperates via a transmission along a fixed driving path with one adjusting shaft. The direction of rotation of the adjusting shaft can then be changed only by reversal of the direction of rotation of the electric motor.

This is disadvantageous in that for each axis to be adjusted an electrical circuit needs to be present with which the direction of rotation of the motor can be reversed. In the case of a direct-current electric motor, for instance in the door of the car, for each axis to be adjusted a switch and wiring need to be present with which the polarity of the motor wiring can be reversed.

As exterior vision units often need to be adjustable about two adjustment axes, in practice, the drive of an adjusting instrument includes more than one electric motor. This is disadvantageous in that electric motors are relatively costly and take up space, which is sometimes scarce.

To counteract this disadvantage mentioned, it has already been attempted to provide a drive for an adjusting instrument with which an exterior vision unit having only one electric motor is adjustable about two adjustment axes.

NL1007139 in that connection describes a drive for an adjusting instrument, in particular for pivoting a carrying element of an exterior mirror for a motor vehicle, whereby the carrying element of an exterior mirror of a vehicle can be pivoted about a standing and a lying adjustment axis, respectively, with the aid of a single electric motor. The drive comprises a single electric motor and a driving shaft coupled therewith, which driving shaft cooperates via a transmission with a first and a second adjusting shaft respectively. The first adjusting shaft is driven only upon rotation of a driving shaft in a first direction of rotation, and the second adjusting shaft is driven only upon rotation of the driving shaft in an opposite, second direction of rotation. The two adjusting shafts are each coupled with the carrying element via a rotation-translation converter. The rotation-translation converters each comprise a rotary disc with an eccentrically positioned pin which are received in two mutually transversely oriented, straight slots of the carrying element. During drive, the pin moves cyclically up and down in the slot, so that the carrying element of the exterior mirror can be pivoted about the standing and lying adjustment axis respectively. While this device definitely provides advantages, it also has disadvantages. For instance, when a desired angular position has been passed, it is necessary, because of the cyclic character of the adjustment, first to continue adjustment to an extreme position before the desired angular position can be sought out again. In addition, the adjusting speed is not constant, and runs up from low to high between the extreme position and the neutral position. Because the setting positions are typically located near the neutral position, it may happen that a desired setting position is missed due to the high speed, and that thereupon it takes a long wait before the desired position can be approached again, while the speed is then, once again, high.

Also, there is known from WO2003/086861 a drive for an adjusting instrument, in particular for pivoting a carrying element of an exterior mirror for a motor vehicle, whereby the carrying element of an exterior mirror of a vehicle with the aid of a single direct-current electric motor can be pivoted in two adjustment directions about a standing and a lying adjustment axis, respectively. The drive comprises a single electric motor with a driving shaft which is coupled via a centrifugal clutch with two driving paths each leading to a different adjustment shaft. Upon energization of the motor, the motor in each of the directions of rotation in each case initially adjusts via the first driving path the first adjusting shaft, and when the motor during the energization exceeds a particular speed (rpm), then adjusts via the second driving path the second adjusting shaft. While this device definitely provides advantages, it also has disadvantages. For instance, the motor must first rev up before the direction of rotation can be changed, which, with a heavier-duty drive and at lower temperatures, can lead to unwanted adjustment. Also, the noise produced by the drive upon adjustment in different directions of rotation, differs strongly due to the difference in rotational speed of the motor. This last may be experienced as annoying by the driver of the vehicle.

The invention contemplates a drive for an adjusting instrument with which, while preserving the advantages mentioned, the disadvantages mentioned can be counteracted. In that regard, the invention contemplates inter alia a drive with which with one motor in one direction of rotation an adjusting shaft can be adjusted in opposite directions of rotation, in particular with constant adjusting speed and with equal motor speed. Also, the invention contemplates a drive which makes it possible with one motor to adjust about two adjustment axes, with which the adjustment axis and/or the adjustment direction about the respective adjustment axes can be chosen by the user, while the adjusting speed can be constant, and while the adjusting shafts can be adjusted with equal motor speed.

To this end, the invention provides a drive for an adjusting instrument as claimed.

The drive for an adjusting instrument comprises a single motor, in particular an electric motor, and a driving shaft coupled therewith. The driving shaft cooperates via a transmission selectively with a first and a second driving path respectively. The drive comprises an operating mechanism with which the transmission is switchable between the first and the second driving path. According to the invention, the operating mechanism is energized by the motor. The operating mechanism can be configured, upon successive energization of the motor from rest of the drive, to select alternately the first and the second driving path as initial driving path. According to the invention, the operating mechanism can form a mechanical flip-flop, with which upon successive energizations of the motor from rest of the drive alternately the first and the second driving path is selected as initial driving path.

By providing the drive with a motor-energized operating mechanism with which the first and the second driving path, from rest, are both alternately selectable as initial driving path, changing driving path can be done with just one motor. In that regard, the driving paths can remain separate, for instance for each to drive an output shaft, but may also come together, for instance for each to drive the same output shaft in reversed direction of rotation, or with a different speed. Accordingly, for instance, it is possible to change adjusting shaft, or the direction of rotation of one adjusting shaft may be reversed, without the necessity of having the motor change its direction of rotation, and with preservation of a constant adjusting speed. When also the direction of rotation of the motor can be changed, for instance in the case of a direct-current electric motor, it is possible with just one motor to adjust about two adjustment axes in two adjustment directions. Such a drive can evidently be applied with great advantage in an exterior vision unit, such as, for example, an exterior mirror unit. Such a drive, however, can also be used to generate via a first driving path a translation, for example a combined height and inclination adjustment of a head support. Also, translations may be generated via both driving paths.

It is noted that such a drive can also be advantageously applied in combination with motors whose direction of rotation cannot be reversed, for example particular types of piezo motors, which—especially when favorably priced and efficient—have only one direction of rotation, such as an asynchronous rotary current machine.

It is noted furthermore that within this context 'electric motor' is to be understood to mean an electrically energized motor, such as, for example, a direct-current motor (DC motor), an alternating current motor (AC motor), a piezo motor or stepping motor.

By configuring the operating mechanism to switch upon successive energization of the driving shaft by the motor in a random direction of rotation, it can be achieved that the drive changes driving path upon each successive energization.

By configuring the operating mechanism to switch upon successive energization of the driving shaft by the motor in the same direction of rotation, it can be achieved that the drive changes driving path only upon successive energization in a particular direction of rotation.

When the transmission comprises an adjustable transmission element which is adjustable so as to have the driving shaft cooperate selectively with the first and the second driving path, preferably an adjustable transmission element that is adjustable in the longitudinal direction of the driving shaft, the switchover mechanism can be relatively simply integrated in the drive, and change of driving path can be relatively simply effected via adjustment by the operating mechanism of the drive.

When the operating mechanism comprises a pulse generator with which an adjustable transmission element of the transmission is adjustable, preferably a pulse generator which comprises a rotation-translation converter, the operating mechanism can be of relatively simple design.

When the adjustable transmission element by energization of the motor is adjustable towards a first position and a second position of the adjustable transmission element that respectively correspond to the first driving path and the second driving path, a relatively simple and robust construction can be achieved.

When the rotation-translation converter comprises a sliding face included in the driving shaft, which extends obliquely with respect to the longitudinal axis of the driving shaft, the rotation-translation conversion can be implemented in a simple and effective manner. When the rotation-translation converter comprises two sliding faces included in the driving shaft which extend obliquely with respect to the longitudinal axis of the driving shaft, and which diverge from a longitudinal median plane of the driving shaft to form a V, it can be relatively simply achieved that irrespective of the direction of rotation of the driving shaft, the direction of translation remains the same.

Elegantly, the adjustable transmission element is spring-biased away from the first and the second position, preferably towards or into a neutral position, more preferably in a longitudinal direction of the driving shaft. As a result, in a relatively simple and operationally reliable manner, it can be achieved that when energization of the motor is removed, the transmission element is prepared via the neutral position to adjust to the other position upon a next energization.

When the operating mechanism comprises a set of stops for the adjustable transmission element corresponding to the first position and the second position, a robust and operationally reliable adjustment can be achieved in a relatively simple manner.

By configuring the adjustable transmission element to reciprocate, in particular, upon energization of the motor, move forth toward one of the stops and, upon removal of the energization of the motor, under spring bias, move back to a neutral position, a mechanical flip-flop can be implemented in a relatively efficient manner.

When the operating mechanism comprises an indexer for indexing the stops, in particular an indexer configured to index the stops in an endless cycle with a reciprocating movement of the adjustable transmission element, it can be achieved in a relatively simple and operationally reliable manner that the drive upon successive energization is operated to change driving path. The indexer is under the action of a spring with which the driving shaft upon removal of the energization of the motor is axially set back. The indexer may be provided with an indexing block which cooperates with a stop connected with the fixed world. Elegantly, the stop may be included in an endless track in the indexing block. The endless track can comprise, for example, a foursome of stop shoulders, and corresponding guiding portions, which are located successively on axially opposite axial sides of the indexing block. The stop shoulders can then respectively correspond to a first rest position, a first active position, a second rest position and a second active position of the drive. The first active position can then, for instance, correspond to the first position of the adjustable transmission element, and the second active position can then correspond to the second position of the adjustable transmission element. The indexing block can then, for instance, during use slide back and forth axially as a result of the driving shaft upon energization of the motor being slid forth by the pulse generator against the action of a spring, and upon removal of the energization and/or in a non-energized condition of the motor being slid back under spring action.

The drive may be provided with an adjustable transmission element which is adjustable between a first position and a second position, whereby upon rotation of the driving shaft in a positive direction of rotation, the adjustable transmission element in the first position via a positive first driving path drives a first output shaft, and in the second position via a positive second driving path drives the first output shaft in reversed direction of rotation, and wherein upon rotation of the driving shaft in a negative direction of rotation, the adjustable transmission element in the first position via a negative first driving path drives a second output shaft, and in the second position via a negative second driving path drives the second output shaft in reversed direction of rotation. What can be achieved in this way is that upon successive energizations of one motor in two directions of rotation, two output shafts can be adjusted in alternate directions of rotation.

The first output shaft may then be configured to adjust a carrier for an exterior vision unit of a motor vehicle about a first pivoting axis, and the second output shaft may then be configured to adjust the carrier about a second pivoting axis.

When the adjustable transmission element is configured to drive, per position and per direction of rotation, via one driving path only, it can be efficiently achieved that each driving shaft can be separately driven in alternate directions of rotation.

The invention also relates to an adjusting instrument, comprising a drive as described above, and a carrier, in particular for carrying an exterior vision unit of a motor vehicle, disposed in a manner pivotable about at least a first pivoting axis, with the first output shaft being configured to adjust the carrier about a first pivoting axis. Thus, elegantly, provision can be made for an alternative adjusting instrument which, with one motor without reversal of the direction of rotation of the motor, is adjustable about a pivoting axis in two directions.

The carrier is then preferably furthermore disposed in a manner pivotable about a second pivoting axis, preferably a second pivoting axis which extends substantially transversely to the first pivoting axis, and the second output shaft is preferably configured to adjust the carrier about the second pivoting axis. Thus, elegantly, provision can be made for an adjusting instrument which with one motor is adjustable about two pivoting axes.

The carrier of the adjusting instrument preferably comprises a housing of an exterior vision unit, in particular a mirror cap.

The invention also relates to a control for an adjusting instrument.

The invention also relates to a method for driving an adjusting instrument, wherein by energization of a motor, switching between a first and a second driving path is effected, and wherein by successive energization of the motor, alternately the first and the second driving path is selected as initial driving path.

It is noted that the technical measures of the drive described in the paragraphs hereinabove can each in themselves also be advantageously used in a drive with another configuration, i.e., the individual technical measures can, if desired, be isolated from their context and be applied alone, and, if desired, be combined with one or several of the above-mentioned measures.

The invention will be elucidated in more detail on the basis of exemplary embodiments which are represented in the drawings. In the drawings:

FIG. 1 shows a schematic perspective view of a first embodiment of the drive according to the invention in exploded condition;

FIG. 2 shows a schematic perspective view of the drive of FIG. 1 in assembled condition;

FIG. 10a shows a schematic representation of a two-button control;

Figure 7:
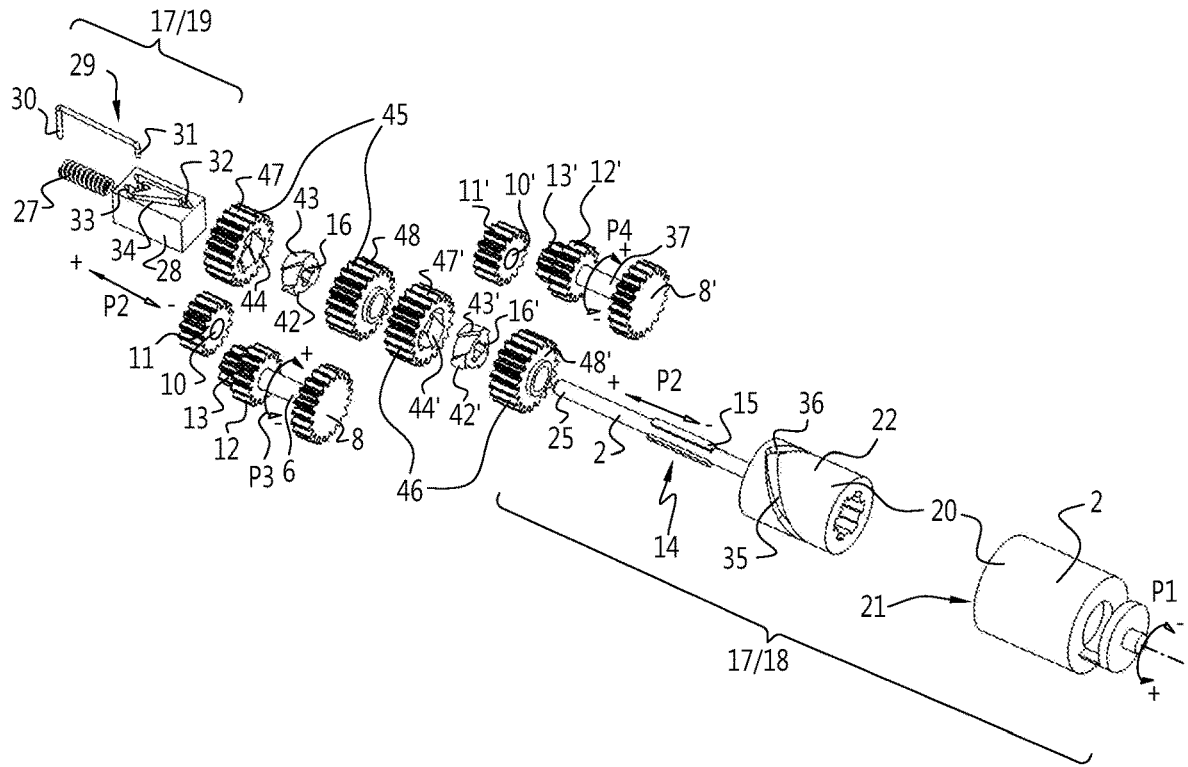
FIG. 7 shows a schematic perspective view of a second embodiment of the drive according to the invention in exploded condition.
Figure 8:
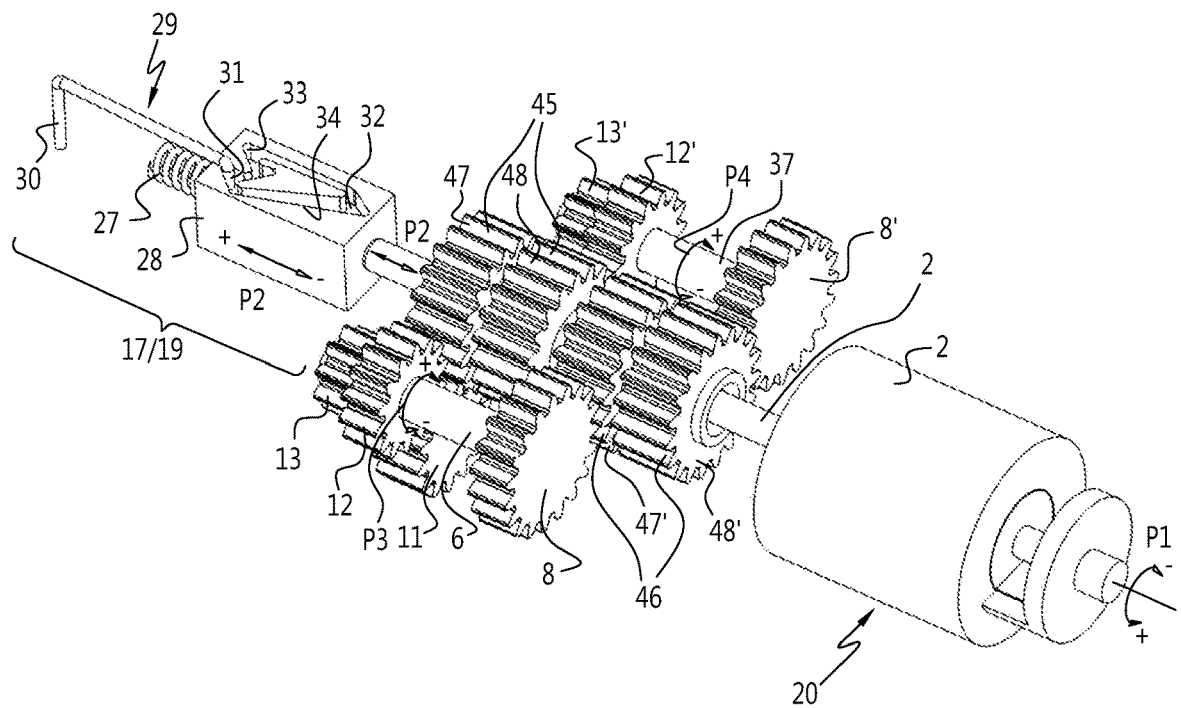
FIG. 8 shows a schematic perspective view of the drive of FIG. 7 in assembled condition.

FIG. 10b shows a schematic representation of an exterior vision unit to be controlled with the two-button control; and FIG. 10c shows a table with an overview of the current flow through the motor and the resulting pivotal movements about the adjustment axes upon consecutive energizations of two push buttons of a two-button control of the drive of FIGS. 7-9 in the adjustment of a carrier of an exterior vision unit coupled with the drive.

It is noted that the figures are only schematic representations of preferred embodiments of the invention, and that these are given by way of non-limiting exemplary embodiments. In the exemplary embodiments, like or corresponding parts in the different embodiments are denoted with the same reference numerals.

FIG. 1 and FIG. 2 show a first embodiment of a drive 1 according to the invention in an exploded and assembled condition respectively. The drive 1 comprises a non-represented single electric motor 2a, in this example a piezo motor 2a with just one direction of rotation, and a driving shaft 2 coupled with the motor shaft. The driving shaft 2 cooperates via a transmission 3 selectively with a first driving path 4 and a second driving path 5 respectively. The transmission 3—as will be further explained hereinafter—is switchable between the first driving path 4 and a second driving path 5 in order to drive a single output shaft 6 in two opposite directions of rotation. The first driving path 4 of the transmission 3 comprises a first gear 7 slidably included around the driving shaft 2, which cooperates with a second gear 8 which is included on the output shaft 6. The second driving path 5 of the transmission 3 comprises a third gear 9 slidably included around the driving shaft 2, which cooperates, via a fourth gear 11 included on an intermediate shaft 10, with a fifth gear 12, also included on the output shaft 6. The output shaft 6 carries an output gear 13. The output gear 13 can cooperate, for example, with a non-represented adjusting element of a carrier of an exterior vision unit, so that it can be adjusted back and forth about an adjustment axis.

The transmission 3 is configured to be switchable and to that end comprises, in this example, an adjustable transmission element 14. The adjustable transmission element 14 is implemented as a catch 15, for example a key, included on the driving shaft 2, which can cooperate with slots 16, for example key-ways, provided in the first gear 7 and third gear 9. The driving shaft 2 is axially adjustable. In a first axial position A of the driving shaft 2, the catch 15 is received in one of the slots 16 of the first gear 7, and upon rotation of the driving shaft 2 the first gear 7 is carried along by the driving shaft 2, while the third gear 9 is rotationally clear of the driving shaft 2. In the second axial position B, the catch 15 is received in a slot 16 of the third gear 9, and upon rotation of the driving shaft 2 the third gear 9 is carried along by the driving shaft 2, while the first gear 7 is rotationally clear of the driving shaft 2. In the first axial position A, the transmission 3 cooperates via the first driving path 4 with the output shaft 6, and in the second axial position B the transmission 3 cooperates with the output shaft 6 via the second driving path 5.

The drive 1 further comprises an operating mechanism 17 with which the switchable transmission 3 is switchable between the first driving path 4 and the second driving path 5. The operating mechanism 17 is energized by the motor 2a via the driving shaft 2, and via the operating mechanism 17, upon successive energizations of the motor 2a from rest, the first driving path 4 and the second driving path 5 are both alternately selectable as initial driving path.

The operating mechanism 17 forms a mechanical flip-flop, with which upon each energization of the motor 2a from rest position of the drive 1 alternately the first driving path 4 and the second driving path 5 is selected as initial driving path. Each time when the motor 2a of the drive 1 has traversed an energization cycle in which it has been switched on and off once, the drive 1 upon energization of the motor 2a from rest will automatically switch over to the other driving path. In this exemplary embodiment, with the direction of rotation of the driving shaft 2 coupled with the motor 2a remaining the same, upon successive energization cycles the direction of rotation of the output shaft 6 is reversed.

In this exemplary embodiment, the operating mechanism 17 comprises a pulse generator 18, and an indexer 19. The pulse generator 18 of the operating mechanism 17 comprises in this exemplary embodiment a rotation-translation converter 20, with which the adjustable transmission element 14 of the transmission 3 is adjustable. The rotation-translation converter 20 comprises a hollow shaft part 21 of the driving shaft 2, in which a cylindrical shaft part 22 of the driving shaft 2 is received. A radially inward pin 23 on the inner surface of the hollow shaft part 21 is received in a helical groove 24 on the outer surface of the cylindrical shaft part 22 of the driving shaft 2. The helical groove 24 forms a sliding face of the rotation-translation converter 20, this sliding face provided in the driving shaft 2 extending obliquely with respect to the longitudinal axis of the driving shaft 2. When the hollow shaft part 21 of the driving shaft 2 rotates relative to the cylindrical shaft part 22, the cylindrical shaft part 22 of the driving shaft 2 slides axially relative to the hollow shaft part 21 of the driving shaft 2.

Upon energization of the driving shaft 2 by the electric motor 2a in the direction of the thick head of arrow P1, the hollow shaft part 21, as a result of the load of exterior vision unit to-be-driven on the output shaft 6 of the drive 1, will first perform a stroke in the groove 24, before the cylindrical shaft part 22 of the driving shaft 2 is carried along via the pin 23. During this internal stroke, the cylindrical shaft part 22 of the driving shaft 2 is axially slid in the direction of the thick head of the arrow P2. The end 25 of the driving shaft 2 is bearing-mounted at its end face on the indexer 19, which is under the action of a spring 27 with which the driving shaft 2 upon removal of the energization of the motor 2a is axially set back.

The indexer 19 comprises an indexing block 28 which cooperates with a stop 29. The stop 29 comprises a stop hook 30, pivotably connected with the fixed world, a free end 31 of which cooperates with the indexing block 28. The free end 31 of the stop hook 30 is received in an endless track 32 in the indexing block 28. The endless track 32 comprises a foursome of stop shoulders 33 and guiding faces 34 corresponding therewith, which are successively located on axially opposite sides of the indexing block 28. The stop shoulders 33 respectively correspond to a first rest position i, a first active position I, a second rest position ii, and a second active position II of the drive 1.

During use, the indexing block 28 slides back and forth axially as a result of the driving shaft 2 upon energization of the motor 2a being slid forth by the pulse generator 18 in the direction of the thick head of arrow P2, and then, upon removal of the motor energization, being reset by the spring 27 in the direction of the thin head of the arrow P2. The free end 31 of the stop hook 30 is guided upon each energization of the motor 2a and upon each removal of the energization, from a stop shoulder 33 along the guiding face 34 to an opposite shoulder 33. The guiding faces 34 ensure that the free end 31 always traverses the cycle in the same direction.

Figure 3:
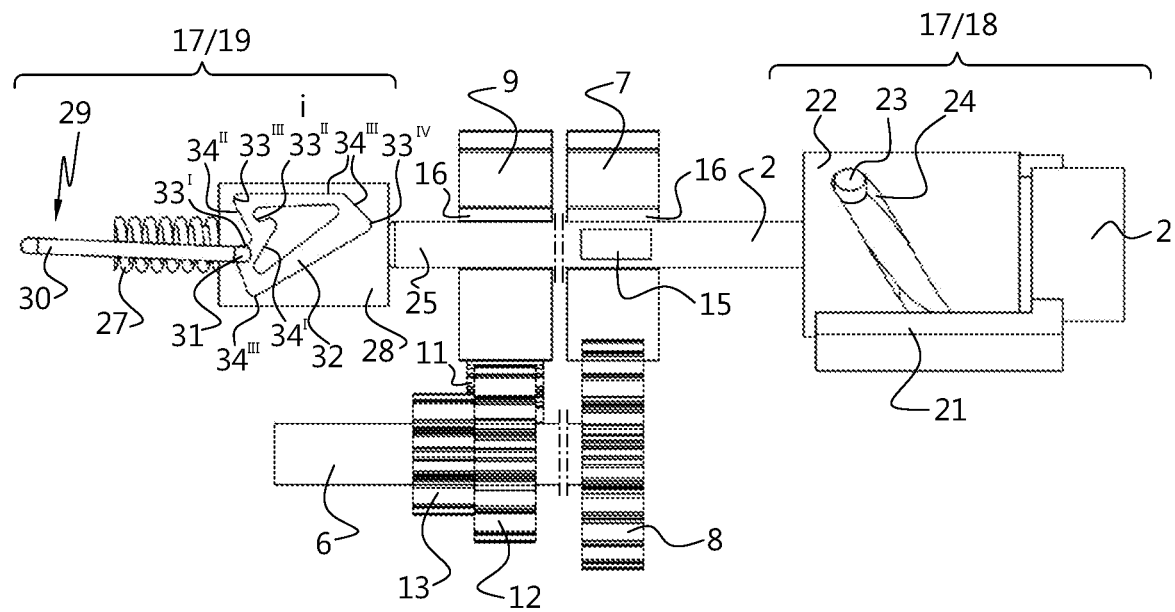
FIG. 3 shows a schematic side view in partial cross section of the drive of FIG. 2 in a first rest position.
Figure 4:
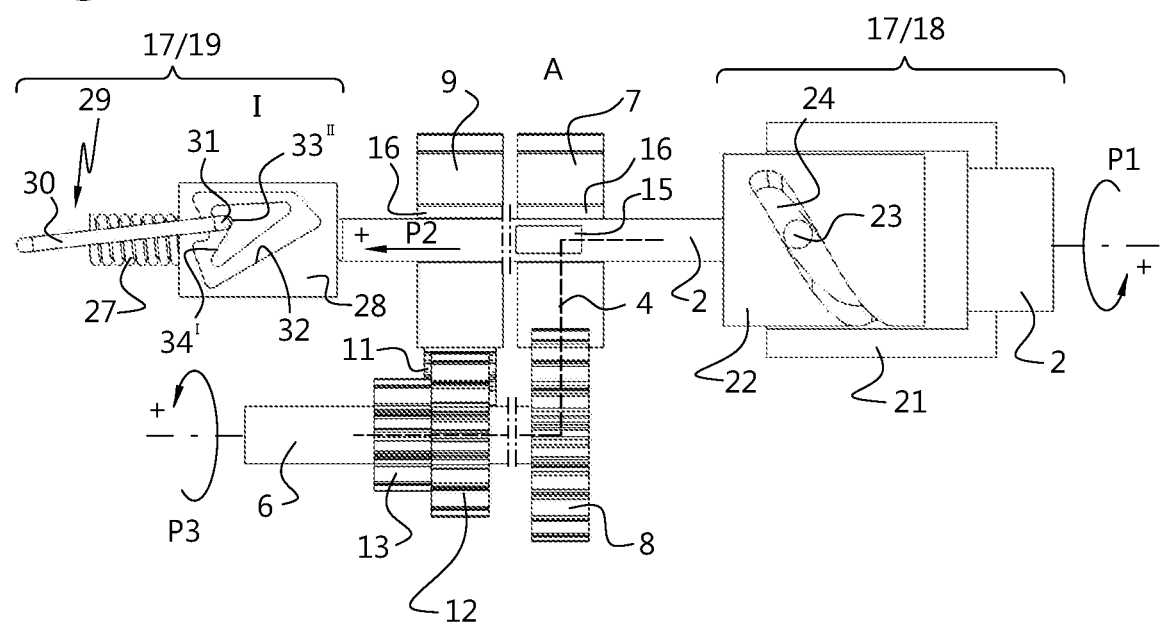
FIG. 4 shows a schematic side view in partial cross section of the drive of FIG. 3 in a successive, first active position in which via a first driving path a first output shaft is driven.
Figure 5:
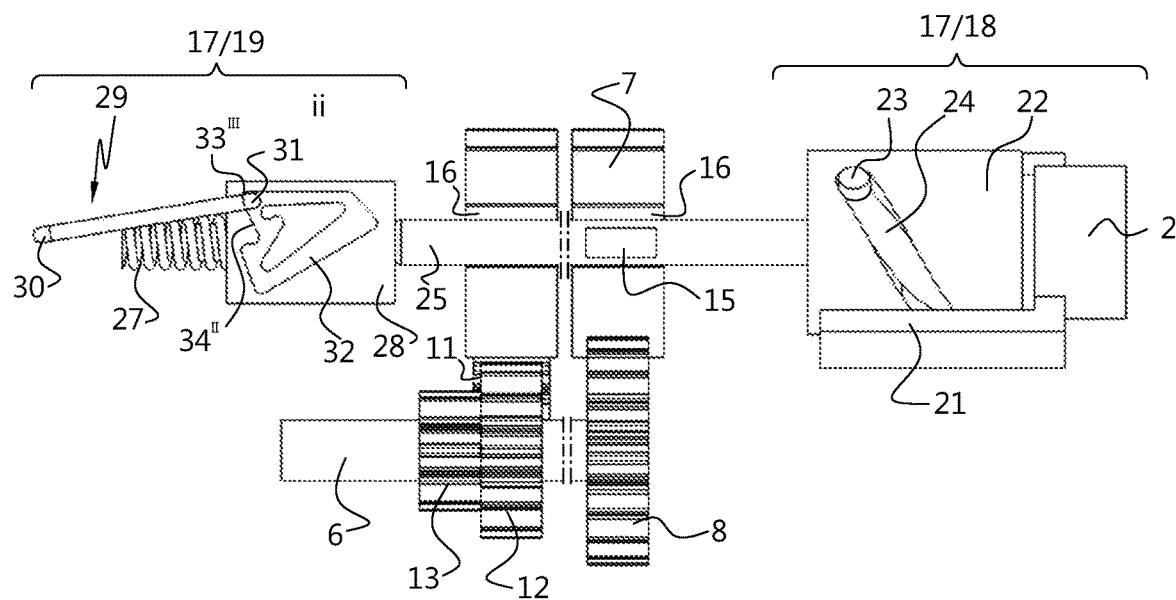
FIG. 5 shows a schematic side view in partial cross section of the drive of FIG. 4 in a successive, second rest position.
Figure 6:
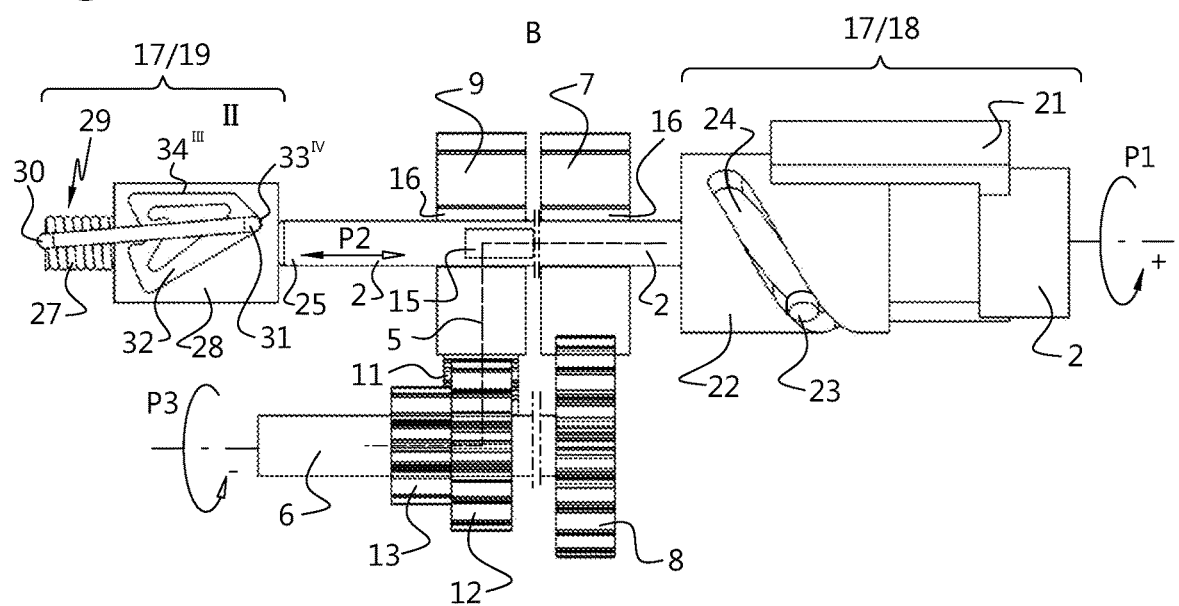
FIG. 6 shows a schematic side view in partial cross section of the drive of FIG. 5 in a successive, second active position in which via a second driving path a first output shaft is driven.

Starting from a first rest position i of the drive, shown in FIG. 3, upon energization of the motor 2a in the direction of the thick head of arrow P1 (as represented in FIG. 4), during traversal of the free stroke in rotation-translation converter 20, the driving shaft 2 is moved axially in the direction of the thick head of arrow P2. The indexing block 28 is thereby pressed against the action of the spring 27, and also moves in the direction of the thick head of arrow P2. The free end 31 of the stop hook 30 then moves in the endless track 32 from the first stop shoulder 33' via the first guiding face 34 to the second stop shoulder 33", which corresponds to the first active position I. In the first active position I, which is represented in FIG. 4, the catch 15 is axially in the first position A, and the driving shaft 2 carries the first gear 7 of the transmission 3 along. Now, via the first driving path 4, the output shaft 6 is driven in the direction corresponding to the thick head of arrow P3. When the energization of the motor 2a is removed, the indexing block 28 of the indexer 19 is axially reset under the action of the spring 27. At the same time, the driving shaft 2 is moved along and the groove 24 of the rotation-translation converter 20 is reset along the pin 23 in the direction of the beginning of the free stroke. The axial movement of the indexing block 28 continues until the free end 31 of the stop hook 30, via the second guiding face 34, has reached the third stop shoulder 33''', which corresponds to the second rest position ii. The second rest position ii is represented in FIG. 5. Upon a successive energization of the motor 2a in the direction of the thick head of arrow P1, the rotation-translation converter 20 of the pulse generator 18 makes a free stroke again, and the driving shaft 2 is again pressed in the direction of the thick head of arrow P2. The driving shaft 2 presses the indexing block 28 against the action of the spring 27 in the direction of arrow P2, and the catch 15 on the driving shaft 2 moves along and leaves the slot 16 of the first gear 7. The axial movement of the indexing block 28 continues until the free end 31 of the stop hook 30, via the third guiding face 34, has reached the fourth shoulder 33", which corresponds to the second active position II. In the second active position II, which is represented in FIG. 6, the catch 15 is axially in the second position B, and the driving shaft 2 carries along the third gear 9 of the transmission 3. Now, via the second driving path 5, the output shaft 6 of the drive 1 is driven in the direction corresponding to the thin head of arrow P3.

When the energization of the motor 2a is removed, the indexing block 28 of the indexer 19 is axially reset again under the action of the spring 27. At the same time, the driving shaft 2 is moved along again and the groove 24 of the rotation-translation converter 20 is reset again along the pin 23 in the direction of the beginning of the free stroke. The axial movement of the indexing block 28 continues until the free end 31 of the stop hook 30, via the fourth guiding face 34, has reached the first shoulder 33, which corresponds to the first rest position i. Upon a successive energization of the motor 2a in the direction of the thick head of arrow P1, the above described sequence starts again.

Thus, there has been described a method for driving an adjusting instrument, wherein by energization of a motor 2a, switching between a first driving path 4 and a second driving path 5 is effected, and wherein by successive energization of the motor 2a alternately the first driving path 4 and the second driving path 5 is selected as initial driving path.

Through energization of the motor 2a, the adjustable transmission element 14 is thus adjustable towards a first position A and a second position B of the adjustable transmission element 14, respectively corresponding to the first driving path 4 and the second driving path 5.

The adjustable transmission element 14, furthermore, is spring-biased away from the first position A and the second position B, towards the rest position, in longitudinal direction of the driving shaft 2.

The operating mechanism further comprises a set of stops for the adjustable transmission element 14, corresponding to the first position A and the second position B, in this case formed by the second and the fourth stop shoulders 33", 33"".

The adjustable transmission element 14 is further configured to reciprocate, in particular, upon energization of the motor 2a, move forth towards one of the stops, and, upon removal of the energization of the motor 2a, move back to a neutral position. Further, the operating mechanism 17 comprises an indexer 19 for indexing the stops, in particular an indexer 19 which is configured to index the stops in an endless cycle with a reciprocating movement of the adjustable transmission element 14.

Also, the switchable transmission 3 is provided with an adjustable transmission element 14 which is adjustable between a first position A and a second position B, whereby upon rotation of the driving shaft 2 in a first direction of rotation, the adjustable transmission element 14 in the first position A drives only the first output shaft 6, namely, via a first driving path 4 in a positive direction of rotation, and whereby upon rotation of the driving shaft 2 in the same first direction of rotation, the adjustable transmission element 14 in the second position B also drives only the first output shaft 6, namely, in a negative direction of rotation, the first output shaft 6 being configured to adjust a carrier for an exterior vision unit of a motor vehicle about a first pivoting axis, in particular in two opposite pivoting directions.

In the first exemplary embodiment, the motor 2a cannot drive in the direction of the thin head of arrow P1. In the second exemplary embodiment shown in FIGS. 7-9, however, this is possible. The driving shaft 2 can here be driven by the motor 2a in opposite directions of rotation of the arrow P1. In the second exemplary embodiment, the transmission 3 comprises in addition to the first output shaft a second output shaft 37. The second output shaft 37 is here included parallel with the first output shaft 6 in transmission 3, and both shafts are substantially implemented as explained in the first exemplary embodiment. The first and second output shafts are operated analogously to the first exemplary embodiment, by the operating mechanism 17. Arranged between the driving shaft 2 and the output shafts 6, 37 are coupling elements 42, with which, depending on the direction of rotation of the driving shaft 2, only the first or the second output shaft is driven.

The structure and the operation of the second exemplary embodiment are as follows. In the second exemplary embodiment, the rotation-translation converter 20 comprises two pairs of cooperating sliding faces included in the driving shaft 2 which extend obliquely with respect to the longitudinal axis of the driving shaft 2, and which diverge from a longitudinal median plane of the driving shaft 2, forming a V. The V-forming diverging grooves 35 are implemented as two helical grooves 35 in the cylindrical shaft part 22 which intersect each other in a V and cooperate with the pin 23 on the hollow shaft part 21. In this exemplary embodiment, the motor 2a is implemented as a direct-current electric motor, whose direction of rotation can be reversed by reversing the current direction. With the drive 1 at rest, the pin 23, due to the action of the spring 27, is received in the bottom 36 of the V grooves 35. Upon energization of the motor 2a, both upon rotation of the driving shaft 2 in the direction of the thick head of arrow P1 and upon rotation of the driving shaft 2 in the direction of the thin head of arrow P1, the relative rotation of the hollow shaft part 21 with respect to the pin 23 will move the cylindrical shaft part 22 axially in the direction of the arrow P2. In this way, the operating mechanism 17 is configured to switch over upon successive energization of the driving shaft 2 by the motor 2a in any direction of rotation. In this second embodiment, upon each successive energization of the motor 2a in any direction of rotation, the drive 1 changes initial driving path.

In this second embodiment of drive 1, as has been mentioned, there are two output shafts involved. The output shafts can each be adjusted in two opposite directions. As will be explained in more detail hereinafter with reference to FIGS. 9a-d, the drive 1 in the first active position I, given a positive direction of rotation of the driving shaft 2, drives the first output shaft 6, namely via a first positive initial driving path 38. In the first active position I, furthermore, the drive, given a negative direction of rotation of the driving shaft 2, drives the second output shaft 37, namely via a first negative initial driving path 39. In the second active position II, the drive 1, given a positive direction of rotation of the driving shaft 2, drives the first output shaft 6 in reversed direction of rotation, namely via a second positive initial driving path 40. In the second active position II, furthermore, the drive 1, given a negative direction of rotation of the driving shaft 2, drives the second output shaft 37 in reversed direction of rotation, namely via a second negative initial driving path 41.

As can be properly seen in FIG. 7, in this second embodiment, the catch 15 is axially lengthened, and it cooperates upon axial adjustment of the driving shaft 2 with slots 16 of two screw couplings 42 arranged around the driving shaft 2. In the first active position I, the lengthened catch 15 is in the first axial position A and the catch 15 upon rotation of the driving shaft 2 in any direction carries along the first screw coupling 42, and in the second active position II the lengthened catch 15 is in the second axial position B and the catch 15 upon rotation of the driving shaft 2 in any direction carries along the second screw coupling 42. The screw couplings 42 are provided with outer thread 43, which cooperates with inner thread 44 of two gear pairs 45, 46 which are included around the driving shaft 2, and which run clear of the catch 15. The inner thread 44 in adjacent gears 47, 48 of each gear pair 45, 46 is equal in direction. Depending on the direction of rotation of the driving shaft 2, the screw coupling 42 screws itself under axial displacement along the catch 15 into engagement with the one gear 47 of the gear pair, leaving clear the other gear 48 of the pair, and vice versa. Thus, in each case one gear is carried along by the driving shaft 2 via the catch 15 and the screw coupling 42, while the adjacent gear of the pair runs clear of the catch 15. The slots 16 of the other screw coupling 42 are not in engagement with the catch 15 then, and the gears 47, 48 of the second gear pair 46 are not driven then.

Figure 9A:
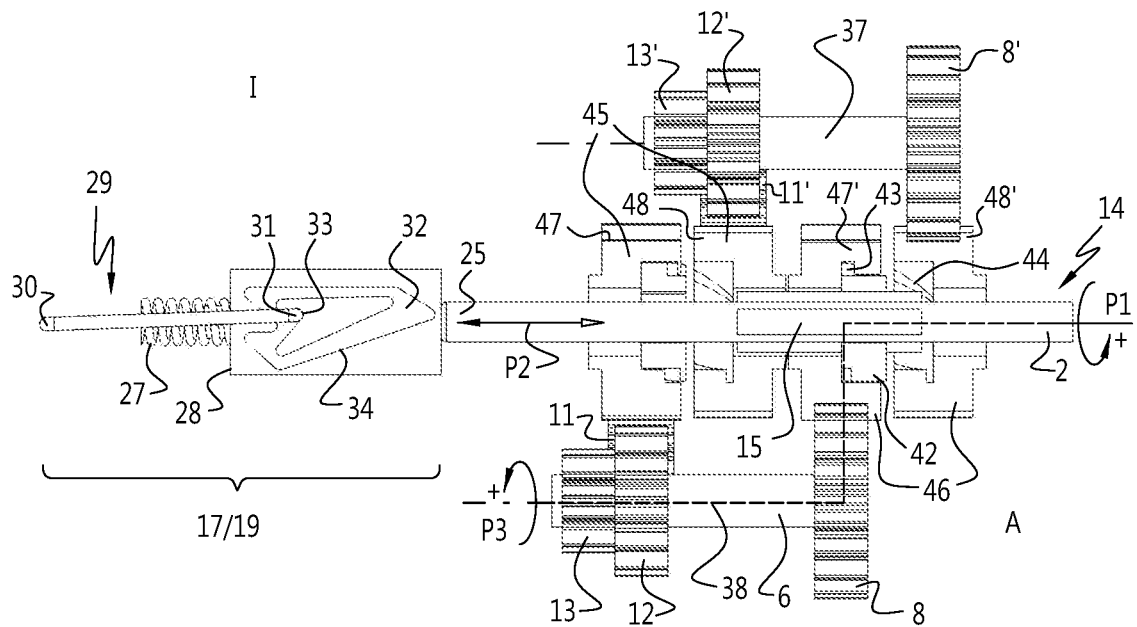
FIG. 9a shows a schematic side view in partial cross section of a detail of the transmission of the drive of FIG. 7 in a first active position in which via a first positive initial driving path a first output shaft is driven in positive direction of rotation for adjustment of the carrier of an exterior vision unit about a standing pivoting axis from right to left (Right-Left, RL)
Figure 9B:
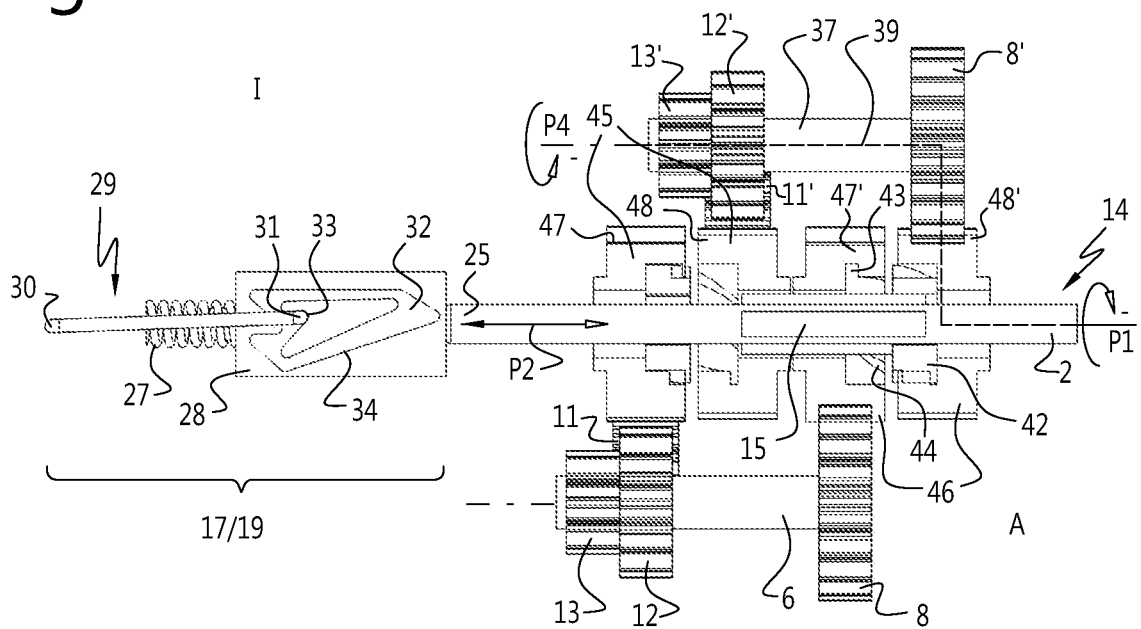
FIG. 9b shows a schematic side view in partial cross section of a detail of the transmission of the drive of FIG. 7 in a first active position in which via a first negative initial driving path a second output shaft is driven in negative direction of rotation for adjustment of the carrier of an exterior vision unit about a lying adjustment axis from below to the top (Down-Top, DT)

As represented in FIG. 9a, in the first active position I, upon rotation of the driving shaft 2 in the direction of the thick head of arrow P1, via the first positive driving path 38 the first output shaft 6 can be driven in the direction of the thick head of arrow P3. And, as is represented in FIG. 9b, upon rotation of the driving shaft 2 in the opposite direction, i.e., in the direction of the thin head of arrow P1, in the first active position I, via the first negative driving path 39 the second output shaft 37 can be driven in the direction of the thick head of arrow P4. If driving proceeds via the first positive driving path 38, the first negative driving path 39 runs clear because the screw coupling 42 is not in engagement there. If driving proceeds via the first negative driving path 39, the first positive driving path 38 runs clear because the screw coupling 42 is not in engagement there.

Figure 9C:
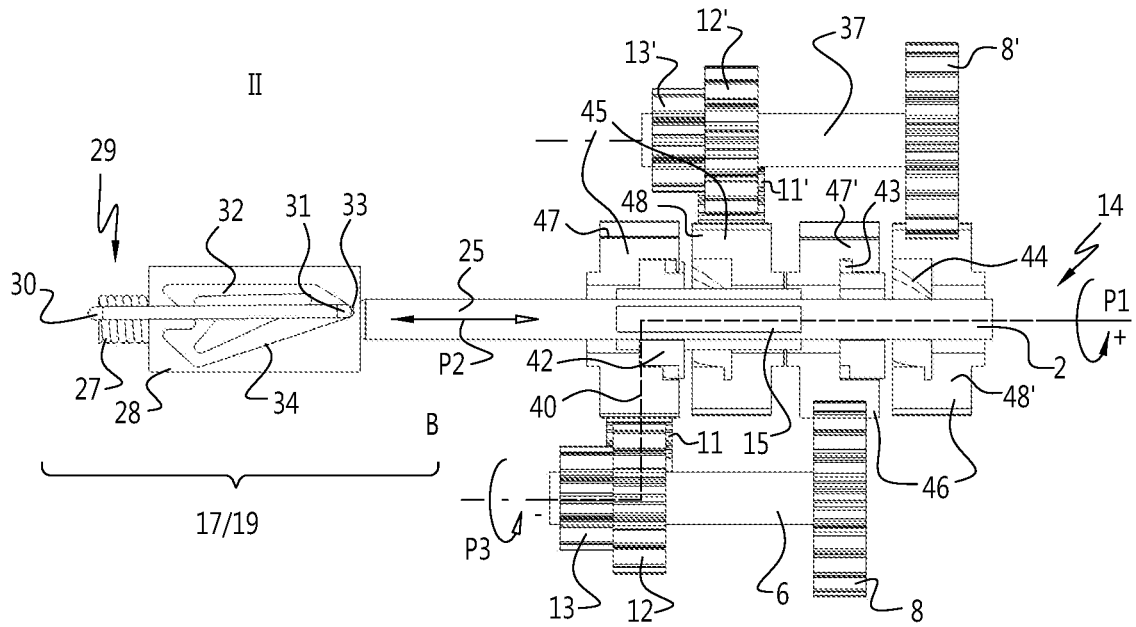
FIG. 9c shows a schematic side view in partial cross section of a detail of the transmission of the drive of FIG. 7 in a second active position in which via a second positive initial driving path a first output shaft is driven in negative direction of rotation for adjustment of the carrier of an exterior vision unit about a standing pivoting axis from left to right (Left-Right, LR)
Figure 9D:
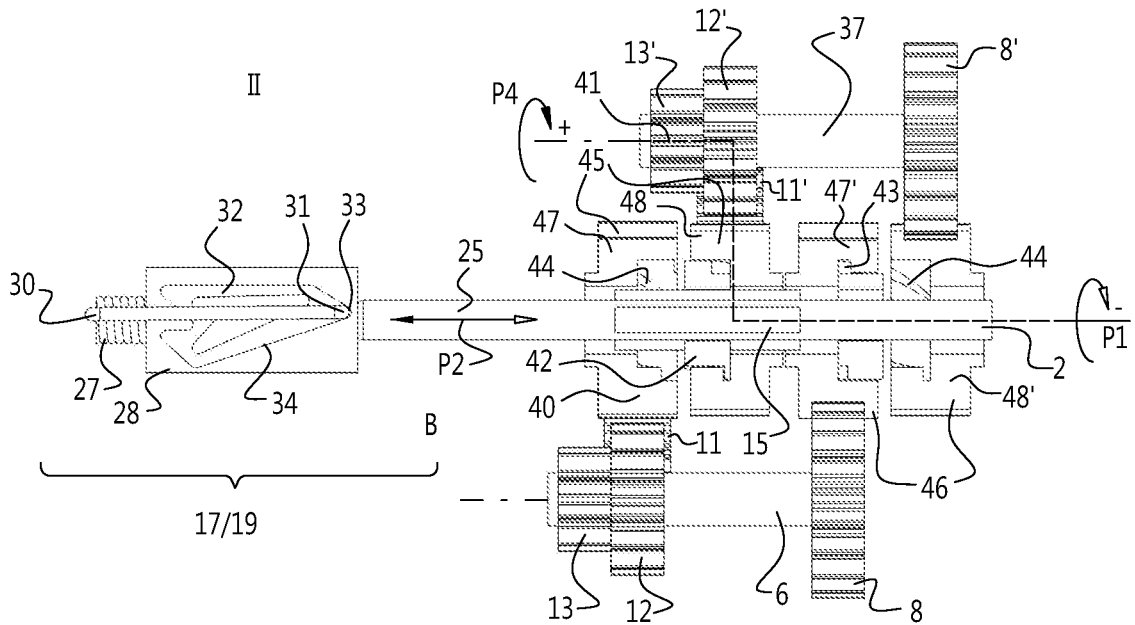
FIG. 9d shows a schematic side view in partial cross section of a detail of the transmission of the drive of FIG. 7 in a second active position in which via a second negative initial driving path a second output shaft is driven in positive direction of rotation for adjustment of the carrier of an exterior vision unit about a lying adjustment axis from the top down (Top-Down, TD)

As represented in FIG. 9c, in the second active position II, upon rotation of the driving shaft 2 in the direction of the thick head of arrow P1, via the second positive driving path 40 the first output shaft 6 can be driven in the direction of the thin head of arrow P3. And as represented in FIG. 9d, in the second active position II, upon rotation of the driving shaft 2 in the direction of the thin head of arrow P1, via the second negative driving path 41 the second output shaft 37 can be driven in the direction of the thin head of arrow P4. If driving proceeds via the second positive driving path 40, the second negative driving path 41 runs clear because the screw coupling 42 is not in engagement there. If driving proceeds via the second negative driving path 41, the second positive driving path 40 runs clear because the screw coupling 42 is not in engagement there.

In the first active position I, the second driving paths 40, 41 are not driven, because the catch 15 then does not carry along the second screw coupling 42. In the second active position II, the first driving paths 38, 39 are not driven, because the catch 15 then does not carry along the first screw coupling 42.

With the aid of this second embodiment of the drive 1, a carrier for an exterior vision unit can be adjusted via the first output shaft 6 about a standing adjustment axis in two opposite adjustment directions, i.e. from left to right and from right to left, and be adjusted via the second output shaft 37 about a lying adjustment axis, i.e. from the top down and from the bottom up.

Such a drive 1 may be provided with a control 49, connected via electric wiring with the motor 2a of the drive, that comprises just two buttons 50, 51. The control 49 then comprises a first button 50 with which via the wiring electrical current for the motor 2a of the drive can be supplied to the motor 2a in a first current direction, and a second button 51 with which the electrical current for the motor 2a can be supplied via the wiring to the motor 2a in a second, reversed current direction. FIG. 10a shows an operating panel for a two-button or two-knob control 49. With the two-button control 49 of FIG. 10a, an exterior vision unit 100 shown in FIG. 10b can be adjusted. The exterior vision unit 100 has a carrier 101 having thereon a mirror glass, which carrier 101, with the adjusting drive, can pivot relative to the housing 102 about a standing adjustment axis 103 and a lying adjustment axis 104 respectively. As is represented in the table of FIG. 10c, through consecutive switch-on of the current supply to the direct-current motor 2a of the drive via the first button 50 of the two-button control 49, the carrier can then be adjusted about a lying axis alternately from the top down (Top-Down, TD) and from the bottom up (Down-Top, DT). Through consecutive switch-on of the current supply to the motor 2a in reversed current direction via the second button 51 of the two-button control 49, the carrier can then be adjusted about a standing axis alternately from left to right (Left-Right, LR) and from right to left (Right-Left, RL). Each time when the current supply to the motor 2a is switched on, the motor 2a is energized, and when the current supply is switched off, the energization of the motor 2a is removed again. Upon switch-on of the current supply, the pulse generator 18 of the operating mechanism 17, as a result of the motor energization, gives a pulse to the indexer, and upon removal of the energization, the indexer 19 of the operating mechanism 17 adjusts the stop of the adjustable transmission element, so that the latter changes between the first position A and the second position B. In this way, each time when the current supply is switched on via one of the buttons, the drive 1 changes initial driving path, that is, alternates between a first and a second driving path. The buttons may be implemented, for example, as push buttons, or as pressure or tumbler switches. The buttons may be implemented in a variety of ways. For instance, they may be implemented not only as mechanical knobs but also as physical knobs of a different nature, for example as a touch pad or pressure sensor. The buttons may also be implemented as virtual buttons, for example, as part of a touch screen. Also, the buttons may be implemented for contactless operation, for example as a capacitive sensor, or as an optical sensor, for example a light barrier or a camera for recognizing hand signals or eye movements.

Upon pressing (understood to include any other operation or activation) of the first button 50, the motor 2a drives the driving shaft 2 in each case, for example, in a positive direction of rotation, and upon pressing of the other button 51, the motor 2a drives the driving shaft 2 in each case, for example, in a negative direction of rotation.

The first positive driving path 38 may then be configured, for example, to adjust the carrier about the standing adjustment axis from right to left, and the second positive driving path 40 may be configured to adjust the carrier about the standing adjustment axis from left to right, or vice versa. The first negative driving path 39 may then be configured to adjust the carrier about the lying adjustment axis from the bottom up, and the second negative driving path 41 may be configured to adjust the carrier about the lying adjustment axis from the top down, or vice versa.

Thus, there has been described a method for driving an adjusting instrument, wherein by energization of a motor, switching between a first and a second driving path is effected, and wherein by successive energization of the motor alternately the first and the second driving path is selected as initial driving path. In particular, the motor can comprise a driving shaft coupled with it. In this way, the driving shaft can cooperate via a transmission selectively with the first and the second driving path respectively. The drive can furthermore comprise an operating mechanism with which the transmission is switchable between the first and the second driving path. According to the invention, the operating mechanism is here energized by the motor via the driving shaft. The method can for instance upon successive energization of the motor from rest alternately select the first and the second driving path as initial driving path. The operating mechanism can, according to the invention, form a mechanical flip-flop, with which upon successive energizations of the motor from rest of the drive alternately the first and the second driving path is selected as initial driving path.

It is noted that the above described two-button control in itself can be regarded as an invention, and in combination with the drive unit can form a drive system. It is noted furthermore that the invention is not limited to the exemplary embodiments described herein. Many variants are possible. Thus, the pulse generator may be implemented with a rotary indexing block, for instance as in the manner of a ballpoint mechanism, and instead of using toothed gear transmissions use can be made of worm gear transmissions, crown gear transmissions, cone gear or friction transmissions. The adjustable transmission element may, if desired, be wholly or partly adjusted between the first and the second position by rotation and/or translation. Also, the output shafts may be concentric, and the output shafts may extend in different directions and/or mutually include an angle. In addition, each of the driving paths can have its own output, or the driving paths can join at the same output in order to drive one output in different transmission ratios and/or directions.

Also, with the motor-energized operation of the adjustable transmission element, adjustment between other drive configurations may be effected. For instance, the transmission element may be adjusted with a motor with two directions of rotation in order to drive in the first position one output shaft in two directions of rotation, and to drive in the second position another shaft in two directions of rotation. Further, the couplings may also be implemented in a manner other than as screw couplings, for example as other direction-dependent couplings, such as slip couplings, one way clutches or wrap springs. Also, the driving paths may each separately perform an adjusting movement, and this adjusting movement may be or comprise a translation.

Such variants will be apparent to the person skilled in the art and are understood to fall within the scope of the invention as defined in the following claims.

LIST OF REFERENCE SIGNS

1. Drive
2. Driving Shaft
2a. Motor
3. Transmission
4. First driving path
5. Second driving path
6. (First) output shaft
7. First gear
8. Second gear
9. Third gear
10. Intermediate shaft
11. Fourth gear
12. Fifth gear
13. Output gear
14. Adjustable transmission element
15. Catch 16. Slots
17. Operating mechanism
18. Pulse generator
19. Indexer
20. Rotation-translation converter
21. Hollow shaft part of driving shaft
22. Cylindrical shaft part of driving shaft
23. Pin
24. Groove
25. End of driving shaft
26. [Spare]
27. Spring
28. Indexing block
29. Stop
30. Stop hook
31. Free end
32. Endless track
33. Stop shoulder
34. Guiding face
35. V grooves
36. Bottom
37. Second output shaft
38. First positive driving path
39. First negative driving path
40. Second positive driving path
41. Second negative driving path
42. Screw coupling
43. Outer thread
44. Inner thread
45. First gear pair
46. Second gear pair
47. One gear
48. Other gear
49. Control
50. First button
51. Second button
100. Exterior vision unit
101. Carrier with mirror glass
102. Housing
103. Standing adjustment axis
104. Lying adjustment axis
A First axial position catch
B Second axial position catch
i First rest position
I First active position
ii Second rest position
II Second active position
P1 Direction of rotation driving shaft
P2 Direction of translation driving shaft
P3 Direction of rotation first output shaft
P4 Direction of rotation second output shaft

The invention claimed is:

1. A drive for an adjusting instrument, comprising a single motor and a driving shaft coupled therewith, wherein the driving shaft cooperates via a transmission selectively with a first and a second driving path respectively, furthermore comprising an operating mechanism with which the transmission is switchable between the first and the second driving path, wherein the operating mechanism is energized by the motor via the driving shaft, and wherein the operating mechanism is configured, upon successive energization of the motor from standstill of the drive, to select alternately the first and the second driving path as initial driving path.

2. The drive according to claim 1, wherein the operating mechanism forms a mechanical flip-flop, with which upon successive energizations of the motor from rest of the drive, alternately the first and the second driving path is selected the initial driving path.

3. The drive according to claim 1, wherein the operating mechanism is configured to switch upon successive energization of the driving shaft by the motor in any direction of rotation.

4. The drive according to claim 1, wherein the operating mechanism is configured to switch upon successive energization of the driving shaft by the motor in the same direction of rotation.

5. The drive according to claim 1, wherein the transmission comprises an adjustable transmission element which is adjustable in order to have the driving shaft cooperate selectively with the first and the second driving path.

6. The drive according to claim 5, wherein the adjustable transmission element is adjustable in a longitudinal direction of the driving shaft.

7. The drive according to claim 1, wherein the operating mechanism comprises a pulse generator with which an adjustable transmission element of the transmission is adjustable.

8. The drive according to claim 7, wherein the adjustable transmission element, by energization of the motor via the operating mechanism, the pulse generator thereof, is adjustable towards a first position and second position of the adjustable transmission element corresponding to the first driving path and the second driving path respectively.

9. The drive according to claim 8, wherein the adjustable transmission element is spring-biased away from the first and the second position.

10. The drive according to claim 9, wherein the adjustable transmission element is spring-biased towards or into a neutral position.

11. The drive according to claim 9, wherein the adjustable transmission element is spring-biased in a longitudinal direction of the driving shaft.

12. The drive according to claim 8, wherein the operating mechanism for the adjustable transmission element comprises a set of stops corresponding to the first position and the second position.

13. The drive according to claim 12, wherein the adjustable transmission element is configured to reciprocate, upon energization of the motor, move forth towards one of the stops, and, upon removal of the energization of the motor, under spring action, move back to a neutral position.

14. The drive according to claim 12, wherein the operating mechanism comprises an indexer for indexing the stops.

15. The drive according to claim 14, wherein the indexer is configured to index the stops in an endless cycle with reciprocating movement of the adjustable transmission element.

16. The drive according to claim 7, wherein the pulse generator comprises a rotation-translation converter.

17. The drive according to claim 16, wherein the rotation-translation converter comprises a sliding face included in the driving shaft, which extends obliquely with respect to a longitudinal axis of the driving shaft.

18. The drive according to claim 16, wherein the rotation-translation converter comprises two sliding faces, which extend obliquely with respect to a longitudinal axis of the driving shaft, and which diverge from a longitudinal median plane of the driving shaft, forming a V.

19. The drive according to claim 1, wherein the switchable transmission is provided with an adjustable transmission element which is adjustable between a first position and a second position, wherein upon rotation of the driving shaft in a positive direction of rotation, the adjustable transmission element in the first position via a positive first driving path drives a first output shaft, and in the second position via a positive second driving path drives the first output shaft in reversed direction of rotation, and wherein upon rotation of the driving shaft in a negative direction of rotation, the adjustable transmission element in the first position via a negative first driving path drives a second output shaft, and in the second position via a negative second driving path drives the second output shaft in reversed direction of rotation.

20. The drive according to claim 19, wherein the first output shaft is arranged to adjust a carrier for an exterior vision unit of a motor vehicle about a first pivoting axis, and wherein the second output shaft is arranged to adjust the carrier about a second pivoting axis.

21. The drive according to claim 19, wherein the adjustable transmission element is arranged to drive, per position and per direction of rotation, via one driving path only.

22. An adjusting instrument, comprising the drive according to claim 1, and a carrier disposed in a manner pivotable about at least a first pivoting axis, wherein a first output shaft is arranged to adjust the carrier about the first pivoting axis.

23. The adjusting instrument according to claim 22, wherein the carrier is furthermore disposed in a manner pivotable about a second pivoting axis, and wherein a second output shaft is arranged to adjust the carrier about the second pivoting axis.

24. The adjusting instrument according to claim 23, wherein the carrier comprises a housing of an exterior vision unit.

25. The adjusting instrument according to claim 24, wherein the housing of the exterior vision unit is a mirror cap.

26. An adjusting instrument according to claim 22, wherein the carrier is arranged for carrying an exterior vision unit of a motor vehicle.

27. The adjusting instrument according to claim 26, furthermore comprising a control, connected via electrical wiring with the motor of the drive, which comprises only two buttons, a first button with which via the wiring electrical current for the motor of the drive can be supplied to the motor in a first current direction, and a second button with which the electrical current for the motor can be supplied via the wiring to the motor in a second, reversed current direction.

28. The adjusting instrument according to claim 23, wherein the second pivoting axis extends substantially transversely to the first pivoting axis.

29. The drive according to claim 1, furthermore comprising a control, connected via electrical wiring with the motor of the drive, which comprises only two buttons, a first button with which via the wiring electrical current for the motor of the drive can be supplied to the motor in a first current direction, and a second button with which the electrical current for the motor can be supplied via the wiring to the motor in a second, reversed current direction.

30. The drive according to claim 1, wherein the single motor is an electric motor.

31. A method for driving an adjusting instrument with a drive, the drive comprising a single motor and a driving shaft coupled therewith, in which the driving shaft selectively cooperates via a transmission with a first and a second driving path, respectively; and an operating mechanism with which the transmission is switchable between the first and the second driving path, wherein the operating mechanism is energized by the motor via the driving shaft, and the method comprises switching the operating mechanism between the first and the second driving path as initial driving path upon successive energization of the motor from standstill of the drive.

\* \* \* \* \*